Figure 1:
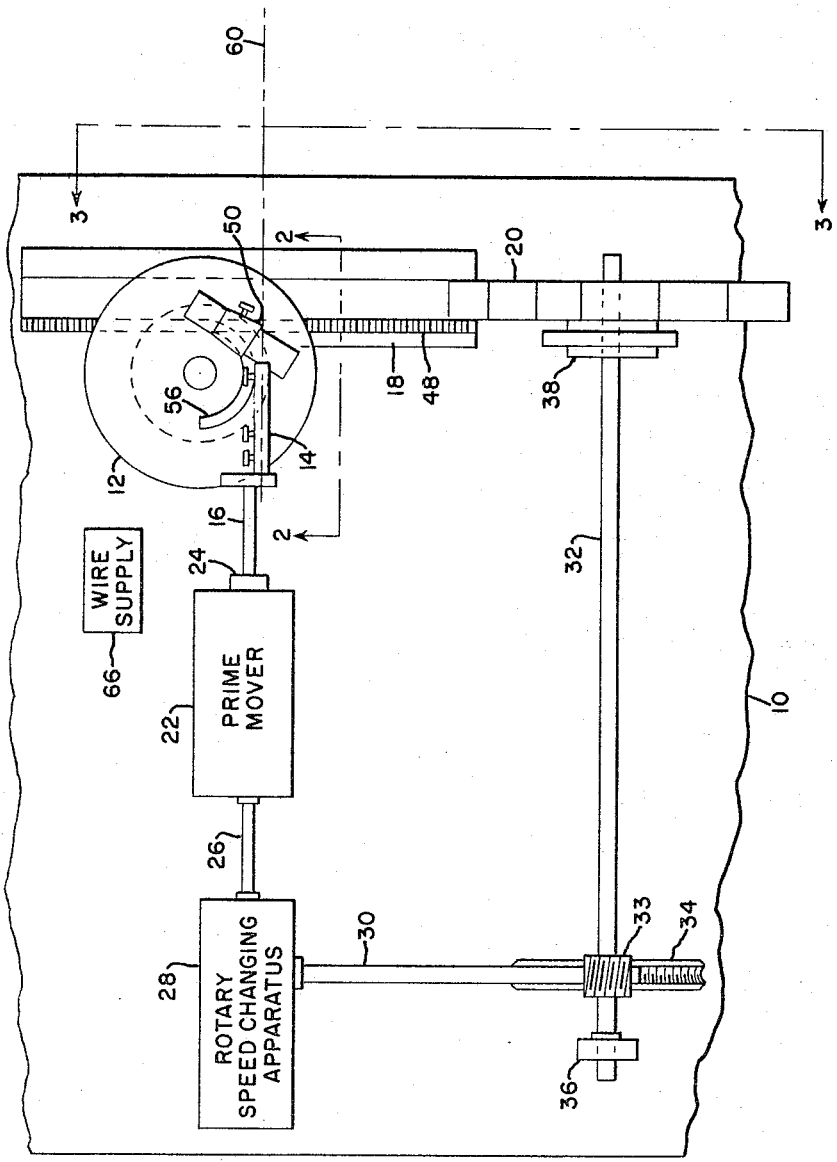

March 14, 1967  C. W. CARSON  3,309,033
CORE INDEX COIL WINDING APPARATUS
Filed May 15, 1963  4 Sheets-Sheet 3

INVENTOR:
CHARLES W. CARSON,
BY Frank J. Thompson
HIS ATTORNEY.

March 14, 1967   C. W. CARSON   3,309,033
CORE INDEX COIL WINDING APPARATUS
Filed May 15, 1963   4 Sheets-Sheet 4
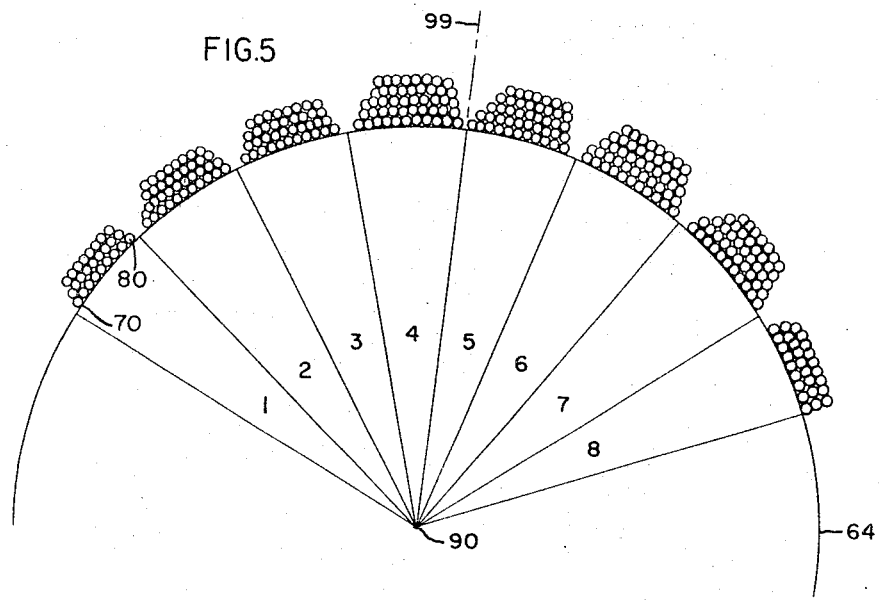
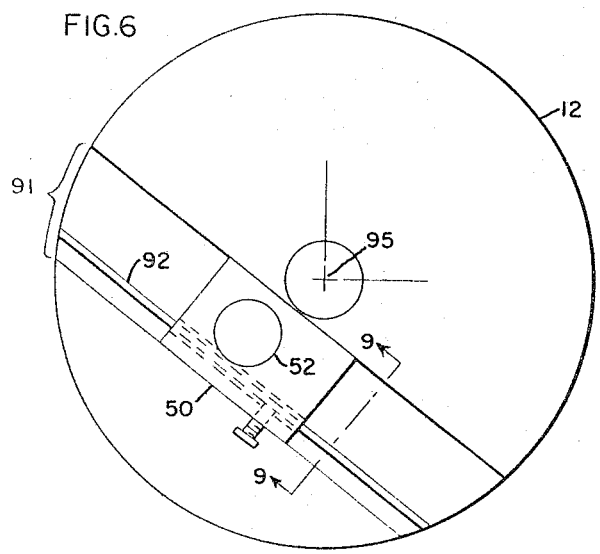
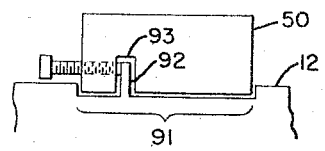
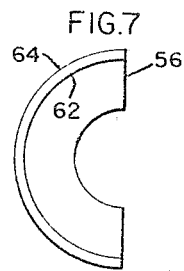
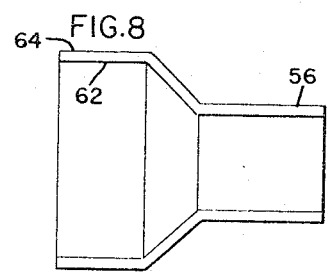
INVENTOR:
CHARLES W. CARSON,
BY *Frank J. Thompson*
HIS ATTORNEY.

United States Patent Office 3,309,033
Patented Mar. 14, 1967

3,309,033
CORE INDEX COIL WINDING APPARATUS
Charles W. Carson, East Syracuse, N.Y., assignor to General Electric Company, a corporation of New York
Filed May 15, 1963, Ser. No. 281,081
2 Claims. (Cl. 242—9)

This invention relates to apparatus for fabricating deflection yokes for cathode ray tubes and more particularly to an apparatus for fabricating a yoke having a toroidally wound coil.

A deflection yoke for a cathode ray tube comprises a ferrite core having coils wound thereon for generating mutually perpendicular electron-beam deflection fields. In one form of deflection yoke, it is advantageous to toroidally wind a coil upon a generally frusto conically shaped yoke core. For example, in a deflection yoke for use with the cathode ray tube of a television receiver, it has been found desirable for reasons of manufacturing economy and improved electrical characteristics to provide a vertical deflection winding wound in this manner. In providing a desired deflection field, it is further advantageous to toroidally wind the coil in a manner whereby the vertical deflection coil has a plurality of layers defining a coil thickness which varies symmetrically about a plane through the coil.

Coil winding apparatus which are known in the art suffer from various defects which render them unsuitable for toroidally winding the desired vertical deflection coil of symmetrically varying thickness. For example, conventional layer winding apparatus which wind succeeding layers back and forth along the core do not provide a coil having a symmetrically varying thickness. As a result, the unsymmetrical winding provides a yoke having unsuitable electrical characteristics.

In a known flyback coil winding apparatus, all turns are wound in one direction until a layer is completed. A half turn, termed a "flyback" turn, occurs at the end of each layer and is returned to an initial point for a successive layer. In making the flyback turn, the flyback arrangement requires momentary halting of the winding operation, indexing of the core, and lead retention. These operations undesirably extend the time for fabricating the coil and increase the overall expense of the coil. In the manufacture of conventional television receiving apparatus where cost is of primary importance, the time and expense in winding the coil with the flyback apparatus become prohibitive.

Accordingly, it is an object of this invention to provide an improved apparatus for toroidally winding a yoke coil.

Another object of this invention is to provide an apparatus for toroidally winding a yoke coil having a thickness which varies symmetrically about a plane through the core.

A further object of this invention is to provide an apparatus for toroidally winding a deflection yoke coil on a core segment in one continuous cycle in a manner which eliminates halting for a winding flyback, indexing of the core, and retaining of a lead.

Still another object of this invention is to provide an apparatus for toroidally winding a coil in a manner whereby the coil winding is built up in segments of layers of turns and in which the segments progress across the core.

In many applications, it is desirable to wind progressive segments of layers of turns wherein the segments have even or odd numbers of layers of turns, as desired. Such an arrangement is beneficial for increasing the packing density of the windings.

Another object of this invention is to provide a toroidal coil winding apparatus for winding progressive segments of turns having an odd number or an effectively even number of layers of turns, as desired.

Another object of this invention is to provide a toroidal coil winding apparatus for winding progressive segments of layers of turns and in which individual layers can be wound with a differing winding pitch.

A further object of this invention is to provide a toroidally wound coil in which the winding is built up in segments of layers of turns and in which the segments have an effectively even number of layers of turns yet do not require a flyback turn.

In fabricating a toroidal yoke winding, the core is generally wound on an effective axis of the core and the turns wound thereby cover an arc of the core which is defined by an angle $\theta_1$. It would be desirable if these same number of turns could be wound in an angle $\theta_2$ where $\theta_1 > \theta_2$. Such an arrangement would materially reduce certain undesired yoke characteristics such as pincushion distortion.

It is still another object of this invention to provide an apparatus for toroidally winding a coil whereby the turns of the coil occupy a lesser arcuate dimension than a similar number of turns wound about an effective axis of the core.

In accordance with the present invention, a toroidal coil winding apparatus is provided having a rotatable winding table with a yoke core segment mounted thereon. A winding fly is spaced from the segment in a desired plane and is adapted to rotate about and feed coil wire to the core segment as the winding table rotates. Means couple energy from a prime mover to the winding fly and to the winding table for causing rotation of both the fly and the winding table. The couple means includes a cam for coupling rotational energy to the winding table and means for providing a desired number of revolutions of the fly with respect to one revolution of the cam. The cam is adapted for causing one cycle of progressive rotation of the winding table during one revolution of the cam and for causing desired rotatory oscillations of the table during the progressive rotation. A feature of the invention provides for the variation in the speed of an alternation of oscillation. The number of revolutions of the fly with respect to one revolution of the cam determines the number of turns wound upon the core while the cam travel determines the winding arrangement of the coil. Another feature of the invention provides a winding table arrangement whereby an effective axis of the core segment may be spaced away from the winding plane of the winding fly to thereby provide off center winding of the core.

Figure 2:
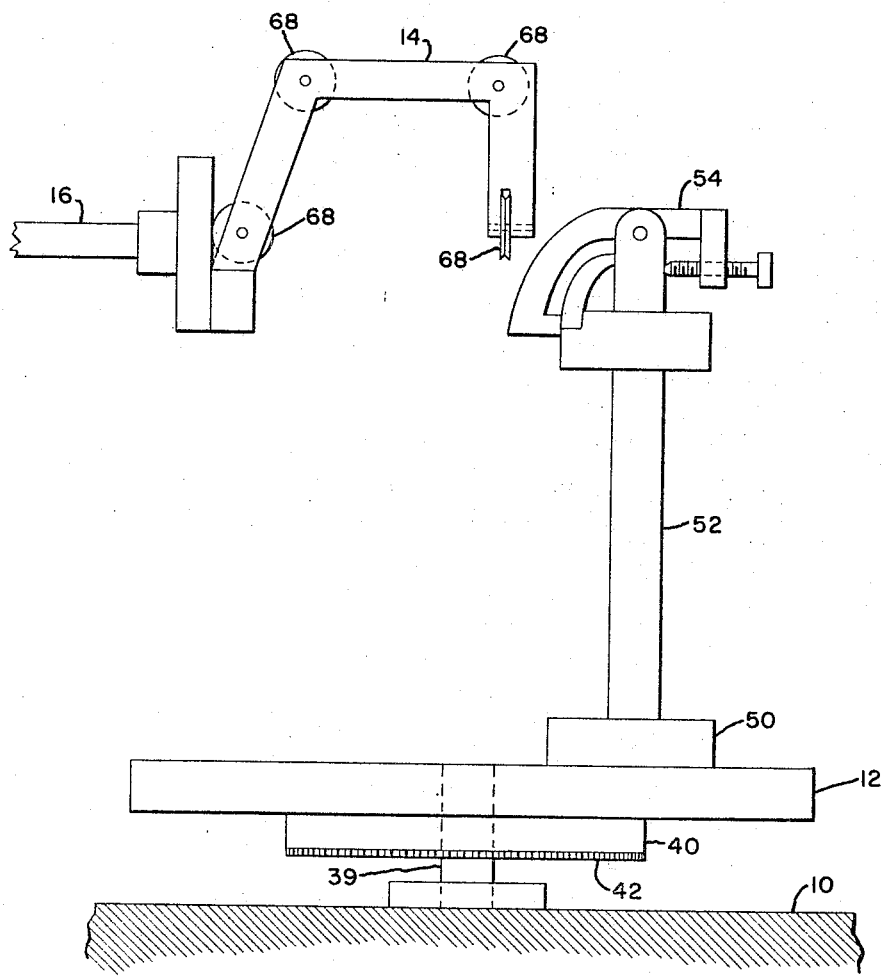
Figure 3:
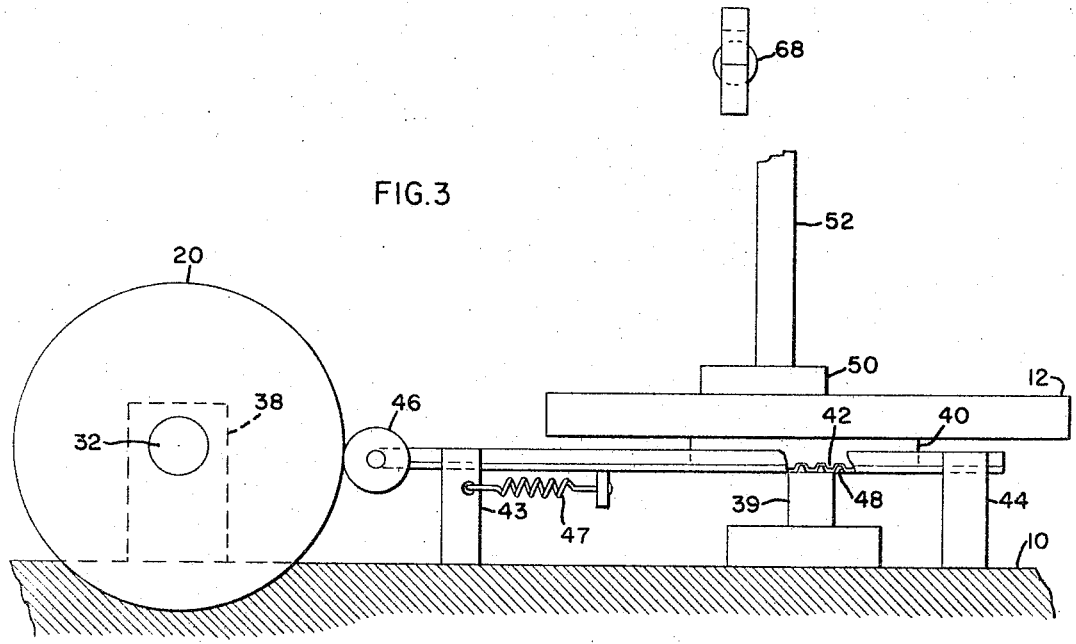
Figure 4:
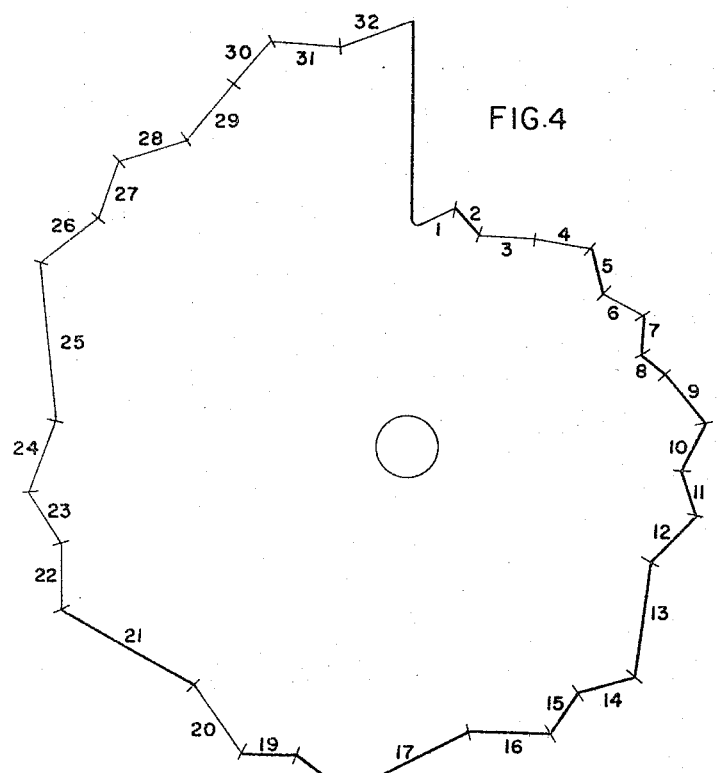

Further objects, features and the attending advantages of the present invention will become apparent with reference to the following specifications and drawings in which:

FIGURE 1 is a plan view of a coil winding apparatus illustrating one embodiment of the present invention, FIGURE 2 is an enlarged view taken along lines 2—2 of FIGURE 1 illustrating the association of a winding table and a winding fly and in which a cam follower has been omitted for clarity, FIGURE 3 is an enlarged view taken along lines 3—3 of FIGURE 1 for illustrating a winding table, cam and cam follower means for driving the table wherein the cam is represented by a circle for the purpose of clarity. The figure is partly cut away to illustrate engagement of winding table and cam follower gears, FIGURE 4 is a drawing of a cam which may be utilized to provide a desired progressive winding schedule, FIGURE 5 is a drawing of a core segment illustrating a winding arrangement similar to the winding arrangement provided by the cam of FIGURE 4, FIGURE 6 is a plan view of a winding table illustrating a means for providing off center winding of a core segment, FIGURE 7 is an elevation view of a yoke core segment upon which a coil is to be toroidally wound, FIGURE 8 is a side view of the core segment of FIGURE 7, and FIGURE 9 is a view taken along lines 9—9 of FIGURE 6.

Referring now to FIGURES 1, 2 and 3 of the drawings, a support table 10 is illustrated having mounted thereon a winding table 12, a winding fly 14 supported by a rotary mounted spindle 16, a geared rack 18 for driving the winding table, a cam 20 for defining a desired motion of the table and a drive means for coupling a rotary drive force to the cam 20 and spindle 16.

The drive means comprises a prime mover 22, which may be an electric motor, and means for providing a desired number of revolutions of the spindle 16 for each revolution of the cam 20. These latter means include a spindle drive shaft 24 which may rotate the spindle at the prime mover r.p.m. or additional conventional means, not shown, may be provided for increasing or decreasing the spindle shaft r.p.m. with respect to the r.p.m. of the prime mover. A shaft 26 couples a rotary motion from the prime mover 22 to a conventional rotary speed changing apparatus 28 which will generally comprise a speed reduction gear box. The reduced rotary motion is coupled from apparatus 28 via a shaft 30, to a cam drive shaft 32 by a worm 33 and a worm gear 34. Shaft 32 is supported on the table 10 by bearings 36 and 38. The cam 20 is coupled to the shaft 32 for rotation therewith by any suitable means.

It is desired that, for each revolution of the cam 20, the spindle shaft rotate a number of times equal to the number of turns to be wound on a core segment. Therefore, the means for coupling rotary energy from the prime mover to the cam is arranged for providing the desired speed reduction. This may be accomplished by suitably selecting the gear ratios of apparatus 28 and gear ratio between the worm 33 and worm gear 34.

Winding table 12 is pivotally mounted by a support shaft 39 on the support table 10, as best seen in FIGURE 2, and includes a circular segment 40 having gear teeth 42 disposed thereon for driving the table about its pivot.

As best seen in FIGURE 3, the rack 18 is supported on the table 10 by bearing surfaces 43 and 44. A cam follower 46 is coupled to one end of the rack, the cam follower being biased against a cam surface of cam 20 by a spring 47. Cam 20, which is discussed in greater detail hereinafter, is shown as a circle for purposes of simplifying the drawing of FIGURE 3. Gear teeth 48 on a surface of the rack 18 as seen in FIGURE 1 and in the cut-away portion of FIGURE 3 engage the gear teeth 42 of the table segment 40. The cam 20 which is driven in rotary motion imparts a linear motion to the rack 18. The rack 18 drives the pivotally mounted table 12 and causes it to rotate.

A yoke segment support jig is mounted on the table 12 for positioning the core segment to be wound in relatively close relation to the winding fly. The jig includes a slide 50, a support stem 52, and a clamp arrangement 54 for supporting the yoke segment above the table at a desired position. In FIGURE 1, a yoke segment 56 is shown held in the clamp. The yoke segment, normally comprises one-half of a ferrite core for a deflection yoke. A front and side view of a typical half section of a yoke core is shown in FIGURES 7 and 8 respectively.

In operation, the winding fly 14 is rotated about an axis 60. The axis 60 is indicated in FIGURE 1. The winding fly and spindle may be arranged so that the axis 60 can be adjusted. The relative spacing of the mounted core segment 56 and the fly permits the fly to wind a turn of wire about inner and outer surfaces, 62 and 64 respectively, of the core segment 56. Wire is fed from a wire supply 66 by means, not shown, to wheel guides 68 on the spindle. By rotating the table 12 with respect to the spindle, the core segment is consequently rotated and a series of turns of wire can be wound upon the core segment. Thus, a coil may be wound in toroidal fashion about the core segment 56. When two such segments have been wound in the manner indicated, they may be joined to form a yoke having a composite core with toroidal windings mounted thereon.

In accordance with a feature of this invention, a cam 20 as shown in FIGURE 4 is provided for use with the hereinbefore described winding apparatus for toroidally winding a core segment in progressive segments. The cam is further adapted to provide layers of turns within a progressive segment having a differing pitch. In order that this feature may be more fully understood and appreciated, reference is made to FIGURE 5. FIGURE 5 illustrates the theoretical arrangement of coils wound in accordance with a cam similar to the specific cam of FIGURE 4. In FIGURE 5, a surface 64 which represents the outer surface of the core segment is shown having a plurality of progressive winding segments wound thereon. In winding the core, all the turns in one segment are wound before the winding of the next segment is initiated. For example, the surface 64 is divided into arcs having sectors 1 through 8. The arc of sector 1 has wound thereon all the turns of progressive segment 1, the arc of sector 2 has wound thereon all the turns of progressive segment 2, etc. Thus, it will be seen that the core is wound progressively and accordingly the winding table is rotated counter clockwise with a progressive motion. However, in order to provide the differing layers of each progressive segment, the table oscillates during the progression. Thus, in the case of progressive segment 1, the surface 64 is initially rotated counter-clockwise about its axis 90 as viewed in FIGURE 5 until a first layer, designated 70 to 80, is wound thereon. The surface 64 than traverses in a clockwise direction to provide the second layer in the section. The surface accordingly rotates in a counter-clockwise direction to provide the third layer in the section. At the termination of the third layer, the surface 64 rotates as shown in FIGURE 5 to an initial winding point of the next sector. Thus the surface 64 rotates progressively in a generally counter-clockwise direction.

For providing the above indicated rotation of surface 64 to build up the progressive segment of sector 1, the table 12 as viewed in FIGURE 1 is rotated in similar counterclockwise, clockwise, and counter-clockwise directions respectively. The cam 20 as shown in FIGURE 4 imparts the necessary linear motion to rack 18 for providing a desired arc of table oscillation and rate of table oscillation. That is, the amplitude and frequency of oscillation are determined by the cam. Thus, the cam 20 controls both the number of turns of a layer and the pitch of a layer. At the termination of a progressive cycle, a coil is fully wound. The winding table is then driven to a position for initiating a first sector winding on a subsequently mounted core segment. By providing suitable cam travel, a progressive segment may be wound having differing numbers of turns on differing layers and having differing winding pitches on differing layers. Furthermore, the cam travel can be arranged to provide variation of pitch within a layer. Thus, a progressive winding arrangement providing any desired combination of layers of turns and pitch may be provided.

In FIGURE 4, the particular cam 20 is indicated as having 32 distinct segments. Each segment represents a layer of turns on the core. A schedule of a core winding indicating the cam segment, sector, and the number of turns for each layer follows:

| Cam Segment | Sector No. | No. of Turn | Direction of Rotation of Surface 64 | Single or Variable Pitch |
|---|---|---|---|---|
| 1 | 1 | 8 | CCW | S. |
| 2 | 1 | 7 | CW | S. |
| 3 | 1 | 12 | CCW | V. |
| 4 | 2 | 10 | CCW | S. |
| 5 | 2 | 9 | CW | S. |
| 6 | 2 | 8 | CCW | S. |
| 7 | 2 | 7 | CW | S. |
| 8 | 2 | 6 | CCW | S. |
| 9 | 3 | 10 | CCW | S. |
| 10 | 3 | 9 | CW | S. |
| 11 | 3 | 8 | CCW | S. |
| 12 | 3 | 11 | CW | S. |
| 13 | 3 and 4 | 19 | CCW | V. |
| 14 | 4 | 9 | CW | S. |
| 15 | 4 | 8 | CCW | S. |
| 16 | 4 | 13 | CW | S. |
| 17 | 4 and 5 | 21 | CCW | V. |
| 18 | 5 | 9 | CW | S. |
| 19 | 5 | 8 | CCW | S. |
| 20 | 5 | 13 | CW | S. |
| 21 | 5 and 6 | 21 | CCW | V. |
| 22 | 6 | 9 | CW | S. |
| 23 | 6 | 8 | CCW | S. |
| 24 | 6 | 11 | CW | S. |
| 25 | 6 and 7 | 21 | CCW | V. |
| 26 | 7 | 9 | CW | S. |
| 27 | 7 | 8 | CCW | S. |
| 28 | 7 | 9 | CW | S. |
| 29 | 7 | 8 | CCW | S. |
| 30 | 8 | 8 | CCW | S. |
| 31 | 8 | 9 | CW | S. |
| 32 | 8 | 8 | CCW | V. |

CW = Clockwise rotation.
CCW = Counterclockwise rotation.

FIGURE 5 illustrates a theoretical distribution of turns of wire in accordance with a winding schedule similar to the above winding schedule. No attempt has been made in FIGURE 5 to make the depicted winding conform exactly to the above winding schedule. FIGURE 5 is thus merely a representation of a winding having a symmetrically varying thickness produced in accordance with a winding schedule similar to the above schedule. In practice, the turns in the upper layers do not have sufficient structural support and fall into the valley between the progressive segments. There is therefore, in practice not such an irregular deviation in thickness as shown in FIGURE 5. The thickness of the built up coil can have a uniformly increasing thickness from sector 1 to the plane of line 99 and a uniformly decreasing thickness from the plane of line 99 to the end of sector 8. Thus, a winding having a symmetrically varying thickness is provided.

I have thus far described a winding apparatus which advantageously is adapted for toroidally winding a core in a manner for providing progressively wound segments which may include layers of turns having differing numbers of turns and which is adapted for providing a variable pitch. It is thus possible to wind coils having thickness which vary symmetrically about a plane through the coil yet which may be wound in a continuous progressive cycle without need for halting the winding operaiton, indexing the core, or retaining a flyback lead. The winding arrangement described may be extended to utilize a plurality of winding tables and spindles which may be driven from a single cam and drive shaft respectively.

As indicated previously, it is advantageous at times to provide turns wound on a frusto-conically shaped core which are more nearly parallel than is provided when the core is wound about an axis of the core. In accordance with another feature of the present invention, relatively inexpensive and simple means are provided for effecting an "off-center" winding. Referring to FIGURE 6, the surface of the table 12 is illustrated in detail. The surface includes a groove 91 extending across the surface. A shoulder 92 extends from a lower surface of the groove. The slide 50 is slidably positioned in the groove and includes a groove 93 therein for mating with the shoulder 92. A screw 94 is threaded in slide 50 and abuts against the shoulder 92 for locking the slide in fixed position. Thus the slide can be positioned at various positions with respect to an axis 95 of the table. Since the winding fly will generally have a fixed plane 60 as shown in FIGURE 1, the core segment which is supported from the slide 50 may have its axis varied with respect to the winding spindle. Hence, the core may be wound off its center.

While I have illustrated and described and pointed out in the annexed claims certain other features of my invention, it will be understood that various omissions, substitutions and changes in the forms and details of the system illustrated may be made by those skilled in the art without departing from the spirit of the invention and the scope of the claims.

What I claim is:

1. A coil winding apparatus for winding of a core segment having a plurality of winding sectors thereon, said apparatus comprising: a prime mover; a winding fly rotatably mounted and coupled to said prime mover; a winding table rotatably mounted and positioned relative to said winding fly, said table having gear teeth on an element thereof; a core segment mounting jig mounted on said table and adapted to hold the core segment with respect to said fly so that said winding fly will wind a turn of wire about the segment when the fly rotates one turn; a cam; a rack having gear teeth disposed thereon and positioned for engagement of said teeth with the teeth of said winding table; a cam follower coupling said rack to said cam; rotary speed reduction means coupling said cam to said prime mover for rotating said cam one revolution for a desired number of rotations of said winding fly; said cam having a cam travel surface to provide progressive rotation of said winding table and surface segments to provide rotary oscillation of said table during a cycle of progressive rotation, said oscillation of said table causing said winding fly to wind overlapping turns of wire within a first sector of the core segment and said progressive rotation of said table causing said winding fly to wind turns of wire within a sector of the core segment adjacent to the first sector.

2. A coil winding apparatus as defined in claim 1 wherein said core segment mounting jig includes a slide segment positioned on said table and adapted to be slidably positioned at different points on said table.

References Cited by the Examiner

UNITED STATES PATENTS

| 2,248,832 | 7/1941 | Taylor | 242—158.5 |
| 2,444,126 | 6/1948 | Wirth | 242—4 |
| 2,657,865 | 11/1953 | Bennert et al. | 242—4 |
| 2,726,817 | 12/1955 | Barrows | 242—4 |
| 2,974,890 | 3/1961 | Davis | 242—4 |
| 3,011,728 | 12/1961 | Klinksiek | 242—9 |
| 3,030,038 | 4/1962 | Baker et al. | 242—4 |
| 3,106,351 | 10/1963 | Fulton | 242—158.4 X |

STANLEY N. GILREATH, *Primary Examiner.*

MERVIN STEIN, *Examiner.*

B. S. TAYLOR, *Assistant Examiner.*